US009736922B2

(12) United States Patent
Trummer

(10) Patent No.: US 9,736,922 B2
(45) Date of Patent: Aug. 15, 2017

(54) BEAM POSITION MONITOR FOR ELECTRON LINEAR ACCELERATOR

(75) Inventor: Stefan Trummer, StraBlach-Dingharting (DE)

(73) Assignee: ASTYX GmbH, Ottobrunn (DE)

( * ) Notice: Subject to any disclaimer, the term of this patent is extended or adjusted under 35 U.S.C. 154(b) by 1237 days.

(21) Appl. No.: 13/389,418

(22) PCT Filed: Aug. 4, 2010

(86) PCT No.: PCT/EP2010/061376
§ 371 (c)(1), (2), (4) Date: Jun. 25, 2012

(87) PCT Pub. No.: WO2011/015609
PCT Pub. Date: Feb. 10, 2011

(65) Prior Publication Data

US 2012/0262333 A1 Oct. 18, 2012

(30) Foreign Application Priority Data

Aug. 7, 2009 (DE) ........................ 10 2009 028 362

(51) Int. Cl.
*H05H 7/22* (2006.01)
*G01S 13/06* (2006.01)

(52) U.S. Cl.
CPC .................................... *H05H 7/22* (2013.01)

(58) Field of Classification Search
CPC ........................................................ H05H 7/22
USPC ..................................................... 324/754.22
See application file for complete search history.

(56) References Cited

U.S. PATENT DOCUMENTS 2,952,795 A * 9/1960 Zublin .................... H01J 23/24 313/44
3,109,146 A * 10/1963 Gordon ................... H01J 25/49 330/4.7

OTHER PUBLICATIONS

Ruf et al., Experimental verification of particle-in-cell simulation results concerning capacitive pickup devices, Proc. of DIPAC09, Basel, Switzerland, 2009, p. 65-67.*
Her et al., Analysis of slot-loaded end-coupled resonator CPW bandpass filters, Proc. of APMC2001, Taipei, Taiwan, 2001, p. 326-331.*
Plum et al., Beam diagnoxtics in the SNS Linac, CP648, Beam Instrumentation Workshop 2002: Tenth Workshop, ed. By Smith and Russo, 2002, Amer. Inst. Physics, p. 195-201.*

(Continued)

*Primary Examiner* — Thomas Valone
(74) *Attorney, Agent, or Firm* — Fish & Richardson P.C.

(57) ABSTRACT

The deviation of an electron beam is measured in a drift tube of a linear accelerator, the wave to be decoupled having a frequency range that corresponds to a multiple of the basic frequency of the acceleration field. Coupling probes, a mixer-based receiving concept with high dynamics and sensitivity, a method for evaluating the measuring signals and a calibration method for calibrating out non-linearities are specified. Disruptive influences through the acceleration field are minimized by the measurement method according to the invention and the frequency range to be evaluated. The high evaluated frequencies also offer geometrically small coupling probes which one can introduce into a drift tube in which only the field of the electron beam to be evaluated exists.

12 Claims, 9 Drawing Sheets

(56) References Cited

OTHER PUBLICATIONS

Eyharts et al: “Beam Transport and Characterisation on AIRIX Prototype at CESTA”, Part I CLE Accelerator Conference, vol. 3, May 12, 1997.
International Search Report for Corresponding International Patent Application No. PCT/EP2010/G61376 dated Mar. 2, 2011.
Park et al: “Design of BPM for Low-Beta Proton Beam Using Magic Code”, Proceedings of the 6th EURKSHOP on Beam Diagnostics and Instrumentation for Particle Accelerators, May 5, 2003, pp. 1257-1259.

* cited by examiner

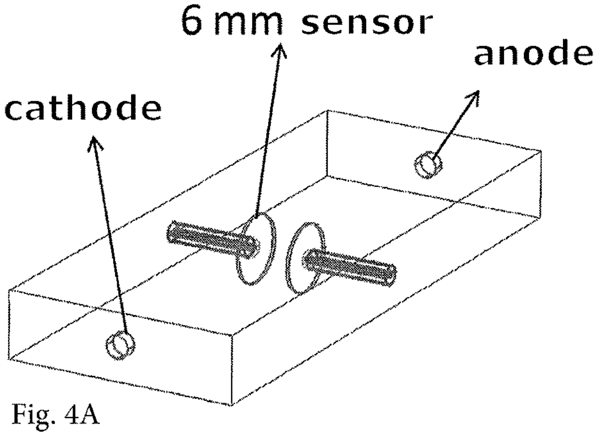
Fig. 4A
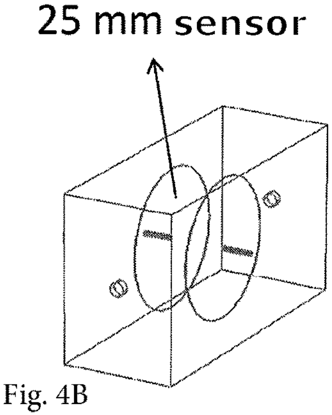
Fig. 4B
Simulation for the measuring sensors with a diameter of 6mm and 25mm
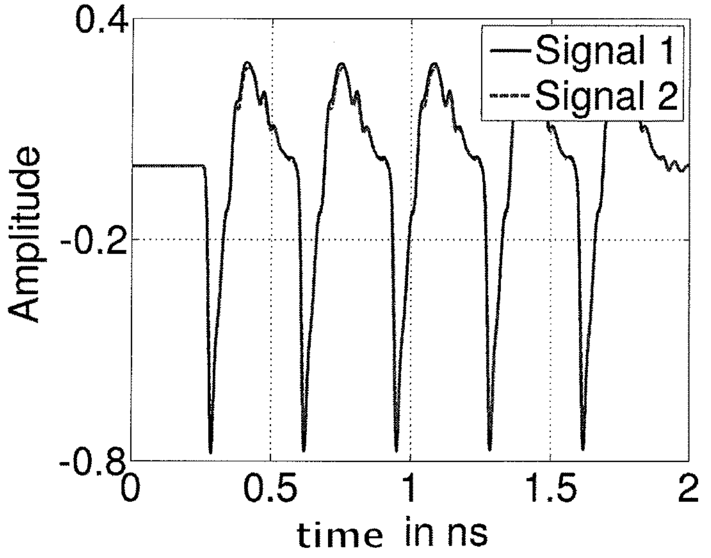
Fig. 5: Time signal with the 25mm pair

BEAM POSITION MONITOR FOR ELECTRON LINEAR ACCELERATOR

BACKGROUND

From a surgical point of view many tumors in the brain, e.g. in the pituitary gland, or in organs such as a lung or the liver have until now often been considered as inoperable because they are difficult to access. For a number of years modern beam technology has been used here. The magic word is: Cyberknife. See, for example, J. Frie; Medicine for Managers; Vernissage-Verlag, Heidelberg; Munich 2007 edition.

This is understood to mean a robot arm, similar to the ones used in automotive production, only that the gripper hand is replaced by a special medical irradiation unit. The robot arm can be moved about 6 axes and has specified position accuracy of 0.2 mm. The movements of the patient during irradiation, e.g. due to respiration, are detected by cameras and compensated. For this purpose 3-4 markers that transmit red light signals are arranged over the patient's chest and the cameras measure their position. In addition, by means of two X-ray devices mounted on the ceiling the so-called adiabatic movements such as relaxation of the spinal column, cramping and pains are detected and corrected by the robot's positioning system. By means of the irradiation unit photon beams generated by a linear accelerator are then blasted onto the tumor in the calculated irradiation directions. The duration and strength of irradiation depends on the type of tumor and its size. The beams thereby strike the tumor sitting in the focal point of the beams from e.g. 100 (of 1200 possible) different irradiation directions. By means of the stereotactic irradiation the beam scalpel only applies its deadly effect to the point of the tumor. The ionizing, high-energy photon radiation causes damage to the genetic material (DNA) in the tumor cells, which ultimately leads to the death of the cell. The irradiated healthy tissue in the path of the beams outside of the intersection point is not subjected to lasting damage by the one-off and therefore lower dosed radiation. The advantages of this treatment method are manifold. Surgical intervention and anesthesia are not required. It is an outpatient treatment and the patient can return to his normal daily life immediately after the treatment.

For the radio frequency (RF) acceleration field of the electrons a frequency of 2.998 GHz has become the standard. However, considerably higher frequencies are desirable in order to be able to reduce both the weight and the size of the accelerator unit. Therefore, the electron linear accelerator in the Cyberknife is operated at a frequency of 9.3 GHz. This is an essential requirement for the mobility of the unit. However, the disadvantage of higher frequencies is the reduced power generation of the RF sources. Thus the electron linear accelerator in the Cyberknife provides maximum acceleration energy of 6 MeV. Moreover, by means of the freedom of movement of the irradiation unit in the Cyberknife only magnetrons can be used to generate the RF acceleration field. However, these have a lower output power than klystrons which can only be used statically by the system. The field of application for the latter is preferably large, static irradiation units which achieve acceleration energies of 6 to 23 MeV. Therefore it depends on the type of tumor and the physical condition of the patient how irradiation is to be implemented and which irradiation equipment is used. The electron beam must strike the photon target accurately at the output of the acceleration tube so that the photon radiation most frequently used for irradiation is produced by the electrons accelerated to the speed of light.

Deviations in the micrometer range already lead to particle loss or asymmetries in the applied dose profile. In this case it can no longer be guaranteed that the patient will be irradiated with the predetermined radiation dose and that the desired therapy success will be achieved. The deviation of the electron beam from the ideal path is measured by so-called "beam position monitors". Magnets then correct the detected deviation or the irradiation is blocked like at the Cyberknife if a specific deviation is exceeded. Within the framework of this invention new concepts for the design of the beam position monitor are being investigated, realized and placed in operation. Particular value is placed on the choice of technologies used to be able to produce new systems suitable for the industry.

FIG. 1 shows in principle the structure of an electron linear accelerator 100. Its essential components are: electron radiation source 110, high frequency source 120, acceleration tube 130, photon target 140. A classic electron radiation source, e.g. the electron gun, has a combination of thermal electron cathode and the optical beam elements, which enable temporal and spatial bundling of the primary electrons. In the first two cells of the accelerator, in the so-called "buncher cells", the electrons are bundled and then accelerated by an electromagnetic field 150 with a longitudinal field portion to almost the speed of light. A circular waveguide is preferably used as acceleration tube and is fed with the $E_{01}$ basic mode. Either a magnetron or a klystron is used as RF source. After leaving the linear accelerator (LINAC) the electrons 160 strike a heavy metal target, generally tungsten, with an energy of 6 to 23 MeV, and the photon radiation most frequently used for the irradiation of tumors is produced. A detailed derivation of the following fundamental physical aspects of electron acceleration can be found in Krieger, Hanno; *Radiation Sources for Technology and Medicine*; Wiesbaden, Teubner; 2005, and Wille, Klaus; *The Physics of Particle Accelerators and Synchrotron Radiation Sources*; Stuttgart, Teubner; 1996.

The electromagnetic wave that accelerates the electron beam is generally generated and amplified by a magnetron or klystron with a transmitting frequency of 2.998 GHz. The magnetron or klystron couples into a rectangular wave-guide in the $H_{10}$ mode. The coupling from the rectangular waveguide into the $E_{01}$ mode of the circular waveguide of the acceleration tube then takes place for matching reasons through a slot because the field configurations are the same at the coupling-in point. The extremely high RF output power that is required to accelerate the electrons to almost the speed of light can only be made available in the pulse operation of the magnetron or klystron for thermal reasons. Therefore, electron bundles are fed into the acceleration tube in proper phase relation by the electron gun. The bundles have a running time of 5 μs, and within this running time single pulses with a pulse duration of 30 ps and a repetition rate of 333 ps. The repetition rate corresponds to a frequency of 3 GHz. After the pulse there is no signal for 5 to 20 ms. FIG. 2 shows the development of the signals over time.

There are 2 types of electron linear accelerators: the travelling-wave and the standing-wave accelerator. According to the travelling wave principle the electrons are accelerated at the crest of the radio-frequency wave when coupled in the proper phase relation. The speed of the electrons that are located just in front of the wave maximum is therefore continuously increased over the whole length of the acceleration tube. The electrons run with the wave. In standing-wave accelerator the length of the acceleration tube is designed so that a standing wave can form in the tube (at the end of the acceleration tube) by reflection of the wave at the end of the acceleration tube. Since the wave troughs would cause negative acceleration of the electrons, over the temporal course of the acceleration the wave has undergone a phase shift of e.g. 180 degrees as soon as the electrons to be accelerated pass into the respective next resonance chamber. It is thus guaranteed that the electrons are always accelerated in the beam direction.

Referring to FIG. 3, a standing-wave accelerator 300 includes a drift tube 310, resonance chambers 320, and coupling cavities 330. According to the standing wave principle, the relocation to the side of the electromagnetic wave in the zero passages into so-called coupling cavities enables considerable shortening of the acceleration tube. While the electromagnetic wave couples into the next resonance chamber through the coupling cavities, the electron beam 340 gets there through a so-called drift section tube. The drift section tube has dimensions such that the 3 GHz $E_{01}$ mode is not propagable, i.e. it lies below the limit frequency. Therefore, the drift section tube of the electron beam between the resonators can be designed according to the requirements of the beam optics and is an ideal place for measuring the position of the electron beam using coupling probes and then for correcting the deviation by means of magnets along the accelerator tube.

SUMMARY

According to the invention a method and a distance measurement apparatus are specified which make it possible to measure the beam deviation of the electron beam in a drift tube of the electron linear accelerator. For this measurement a frequency range is used for the first time which corresponds to a multiple of the frequency of the acceleration field in the resonance chamber. The functional capability of the method has thus been demonstrated specifically in the frequency range of around 6 GHz. In the following 6 GHz designates the evaluation of the frequency band of around 5.98 GHz. This frequency corresponds to the $1^{st}$ harmonic of the frequently used basic frequency of the acceleration field which has a frequency of 2.99 GHz. The goal of the invention and of the use of frequencies which correspond to a multiple of the basic frequency of the acceleration field is to achieve a greater degree of accuracy when determining the position of the beam and therefore to avoid stray radiation which can destroy healthy tissue during radiation therapy. According to the invention an arrangement for decoupling the field of the electron beam and a receiving concept for evaluating the beam diversion with high dynamics and sensitivity is described.

Within the framework of the invention innovative concepts for measuring the position of beams in electron linear accelerators have been investigated and assessed, and those showing the greatest promise of success have been developed, produced and then measured. It is proven to be particularly advantageous to evaluate a harmonic of the basic oscillation because then the size of the coupling probes is considerably smaller than with 3 GHz, interference due to the basic beam frequency can be eliminated by appropriate band-pass filtering, and the sensitivity is greater. Moreover, it has proven to be particularly advantageous to measure the beam position within a drift tube because only the E-field of the electron beam is present here and by means of "post-pulse oscillation" depending on the probe size electromagnetic waves of the electron beam can be decoupled which have very pronounced frequencies which are multiples of the frequency of the alternating voltage which is coupled into the linear accelerator by a high-frequency generator in order to generate the acceleration field. Analyses of the field characteristics with CST Particle Studio have shown that in the drift tubes the electron beam has a field in the TEM mode. The decoupling of the TEM field for measuring the beam position is implemented by means of 4 capacitive sensors which are respectively arranged with an offset of 90 degrees. Receiving concepts were investigated at 6 GHz. The results can also be transferred to higher harmonics.

In order to decouple the pulsed, electromagnetic wave at 6 GHz a waveguide filter has been developed with the aid of CST Microwave Studio. The filter decouples the corresponding harmonic. The settling time should not become too great so that the filter is quickly in a stable state due to the high-energy pulses of the electron beam. One can achieve miniaturization of the waveguide filter by introducing a dielectric.

In the analysis of the receiving concepts the concept with a mixer and an external logarithmic detector has proven to be advantageous. In contrast to logarithmic direct detection the mixing principle enables the evaluation of different higher harmonics, a high frequency selectivity in the IF range, the use of external housed detectors and large range of choice of detectors for different dynamic and frequency ranges in contrast to bare die detector chips that can be used in the RF range. Moreover, the distance between external housed detectors and the voltage controlled oscillator (VCO) prevents any adverse effect upon sensitivity due to crosstalk. The diode detector which is also analyzed has the lowest hardware complexity. However, this method fails due to the insensitivity and the reduced dynamics. The sum and difference formation of the RF signal of two opposite channels, also analyzed, proved to be unsuitable for series production due to its strong dependency upon production tolerances of the acceleration tube.

Within the framework of the mixing concept a compact, coplanar mixer with outstanding isolation between the LO and the IF gate was developed. A particular challenge was the radiation hard design of the high frequency circuit. In order to correspond to this, the circuit concept was realized on a ceramic substrate in coplanar waveguide technology and then integrated into Kovar housing, which is a tried and tested concept in satellite technology. Kovar was chosen because it has the same expansion coefficient as ceramic. In either of the two receiving concepts an exceptionally compact, hermetically sealed high frequency assembly was thus produced which contains all of the RF components and does not require any additional external RF cables. The signal processing concept of the DC voltages from the logarithmic detectors is based on an "oversampling" strategy. Here the 5 μs pulse of the electron bundles is oversampled 10 times and so completely reconstructed in order to be able to implement "state of the art" algorithms in a downstream digital signal evaluation. Analyses have shown that deviations of the electron beam from the ideal path can be measured by the mixing concept in the micrometer range if the component tolerances of the respective channels are measured and corrected during the signal processing.

BRIEF DESCRIPTION OF THE DRAWINGS

FIGS. 4A and 4B show simulation designs for the decoupling of an electron beam, which is generated by a cathode and an anode. Two pairs of probes with a probe diameter of 6 mm and 25 mm are simulated in this case.

FIG. 5 shows the time signals decoupled at the pair of probes with 25 mm probe diameter and which have slight amplitude differences.

DETAILED DESCRIPTION

A good possibility for measuring the beam position of the electrons in the drift tubes between the resonance chambers is to provide four capacitive probes which decouple a part of the electric field. An analysis of the field characteristics in the drift tube with CST Particle Studio shows that this is a field in the TEM mode.

Figure 1:
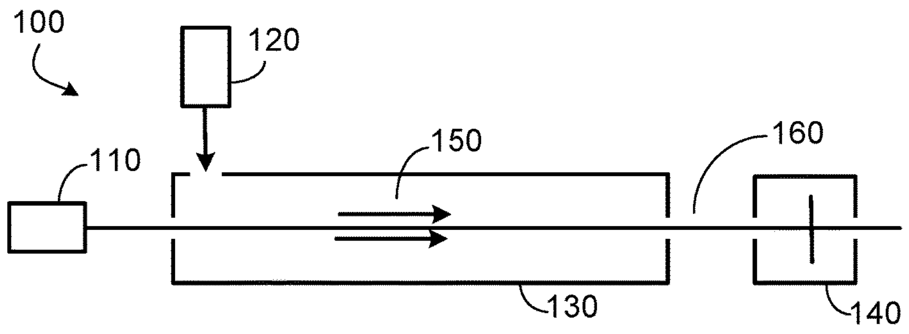
FIG. 1 shows in principle the structure of a linear accelerator consisting of a high frequency source, an electron radiation source, an acceleration tube and a photon target. The electron beam is accelerated through the E-field of the RF wave.
Figure 2:
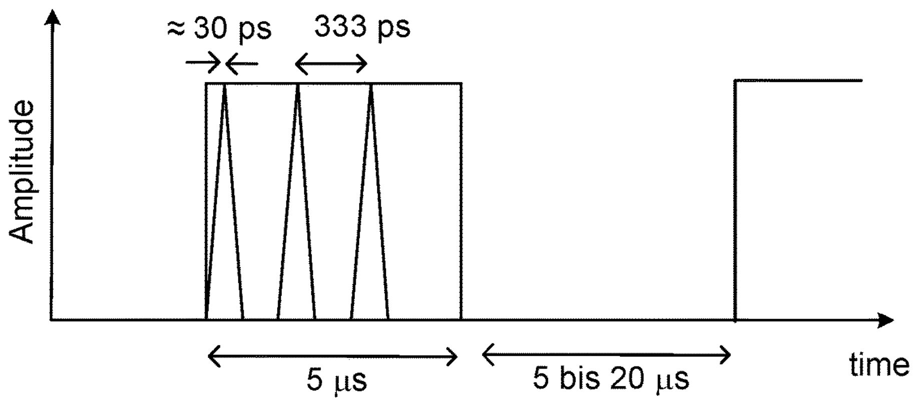
FIG. 2 shows the time signal that is obtained when the electromagnetic field carried by the electron beam is decoupled. The time signal consists, for example, of single pulses which have durations of 30 ps and repetition durations of 333 ps and they are located within a pulse which has a duration of 5 μs and a repetition duration of 5 to 20 ms.
Figure 3:
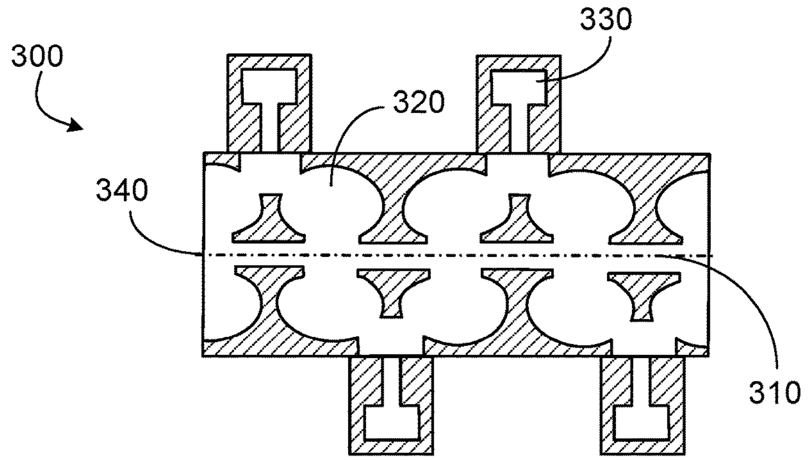
FIG. 3 shows a cross-section of a standing-wave resonator with relocated coupling cavities for the RF acceleration field. There are drift tubes located between the resonance chambers in which the electron beam passes to the next resonance chambers.
Figure 6:
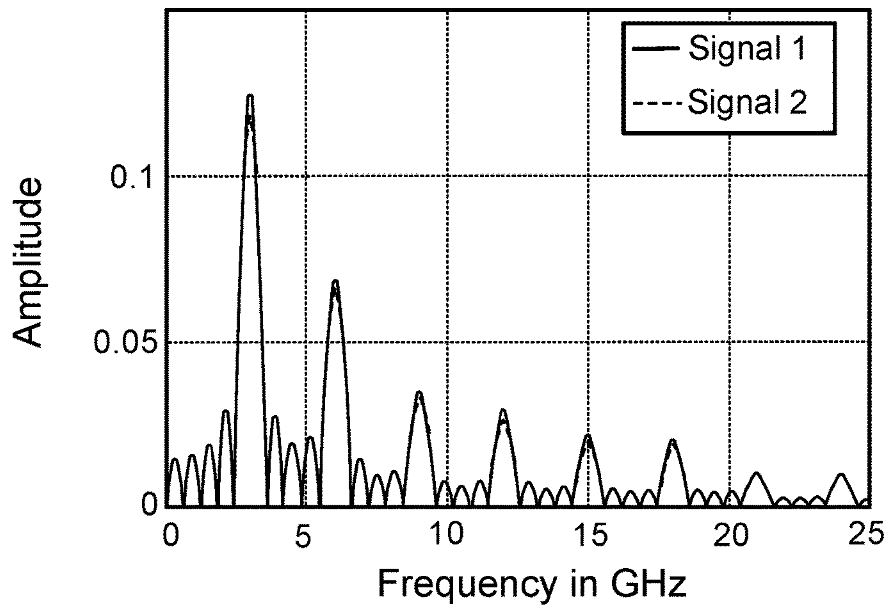
FIG. 6 shows the frequency signals decoupled at the pair of probes with a 25 mm probe diameter and which have small differences in amplitude, the greatest amplitude difference being at 2.99 GHz, and so at a frequency which corresponds to the basic frequency of the acceleration field.
Figure 7:
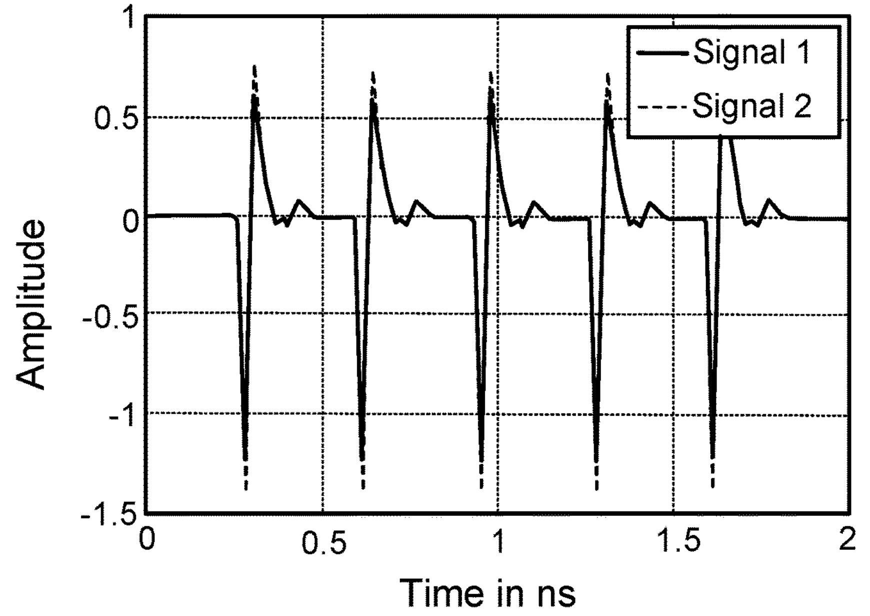
FIG. 7 shows the time signals decoupled at the pair of probes with a 6 mm probe diameter, and which have amplitude differences which are more strongly pronounced than on the pair of probes with a probe diameter of 25 mm.
Figure 8:
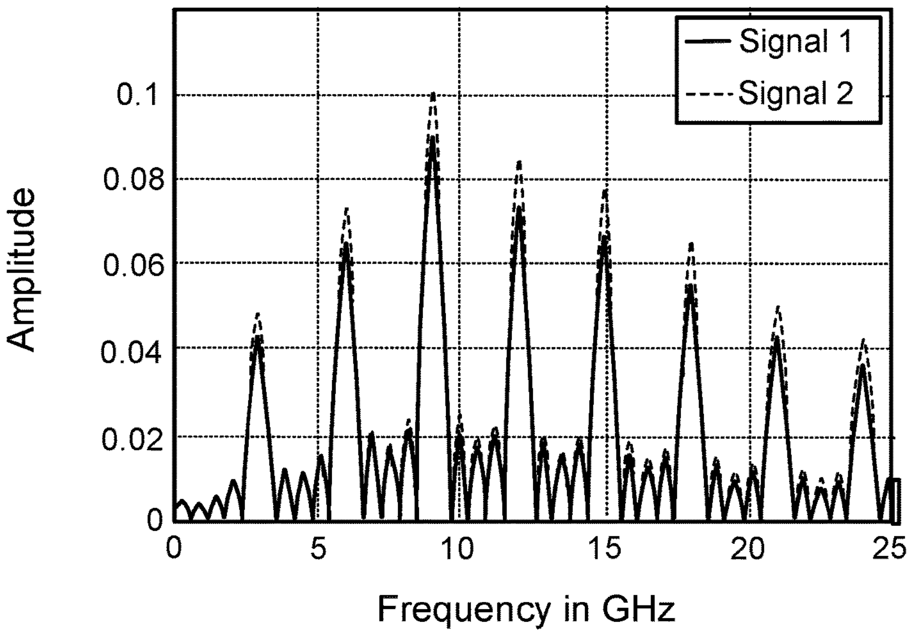
FIG. 8 shows the frequency signals decoupled at the pair of probes with a 6 mm probe diameter, and which have amplitude differences which are more strongly pronounced than on the pair of probes with a 25 mm probe diameter, and the greatest amplitude difference being at 8.97 GHz, and so at a frequency which corresponds to the $2^{nd}$ harmonic of the basic frequency of the acceleration field.
Figure 9:
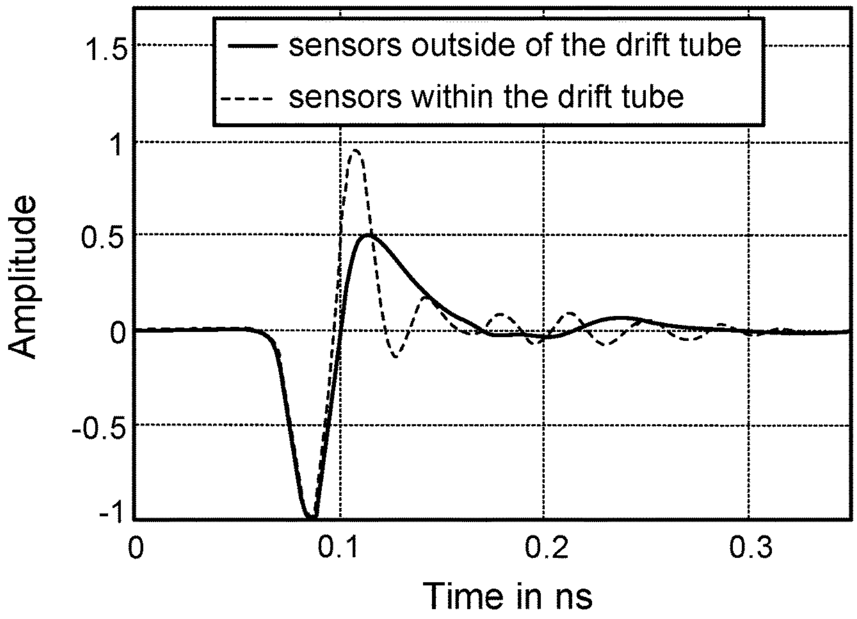
FIG. 9 shows a comparison of the time signals within and outside of a drift tube. Within the drift tube "post-pulse oscillation" can be seen that brings about greater occurrence of the 6 GHz component.
Figure 10A:
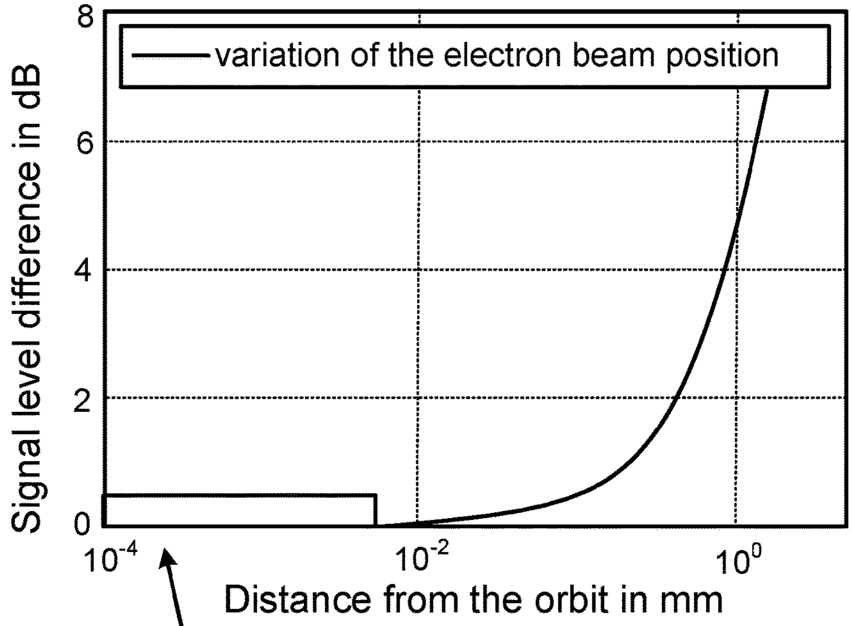
FIGS. 10A and 10B show the signal difference of the 6 GHz component at the receiving probes over the variation of the electron beam position. Signal differences are also produced by slightly different distances to the electron beam.
Figure 10B:
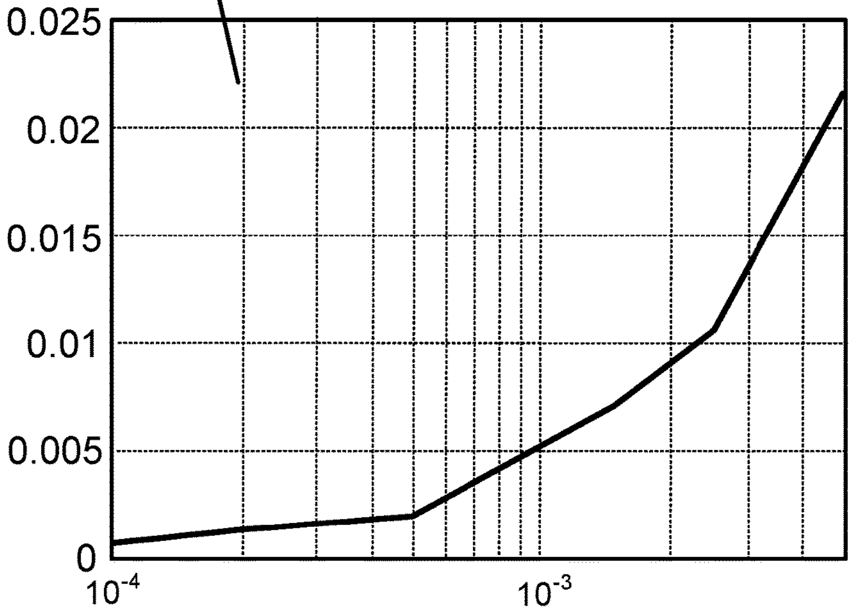

In this section the design of the probe diameter will be examined more closely. Referring to FIG. 4, simulations with CST Particle Studio take place in a vacuum and only two opposite probes 410 and 420 are considered. With an ideal electron beam position (no deviation from the ideal path of the electron beam) the two opposite probes are the same distance away from the beam and so the same signal level is applied. The signal is affected by the size of the probes. This can be reproduced in the simulation with the CST Particle Studio program. For this purpose a cathode 430 and an anode 440 must be defined for the electron beam. Next the type of source is specified. The particles are electrons that are distributed within a bunch in a Gaussian manner. The exit speed is specified relativistically as the speed of light. The electric charge is in the pCoulomb range. These values correspond approximately to the conditions prevailing on the LINAC. As a next step the probes must be defined. The simulation is made with two different probe diameters of 6 (depicted in FIG. 4A) and 25 mm (depicted in FIG. 4B). Above all one must ensure that the coaxial external conductor lying on the ground doesn't touch the probe. Therefore, the external conductor has an offset backwards to the probe of 1 mm. Implemented into the simulation program one then obtains the situation in FIGS. 4A and 4B. If the probes are now different away from the electron beam, different signals are produced which have both a phase difference and an amplitude difference. In the simulation one probe has a beam distance of 4 mm and the other a distance of 5 mm. The simulation time is 2 ns, and so 5 electron packets fit into the time span. The arrangement of the pairs of probes with a 25 mm diameter is now simulated with CST Particle Studio. As a result one obtains the respective time signals (FIG. 5) which are transformed into the spectral range by a Fourier transformation (FIG. 6). As expected, the largest signal portions are to be found at the 3 GHz basic beam frequency. Here the amplitude difference between the two signals is 5.157 percent or 0.23 dB. In addition, there is a phase difference of 1.5°. In the simulation with the 6 mm pair one obtains the result of the time signal in FIG. 7 and the frequency signal in FIG. 8. Here the largest signal portion is at 9 GHz, the $2^{nd}$ harmonic of the basic beam frequency. This is caused by the smaller probes which due to their smaller size detect a narrower time signal when the electrons fly past. In the spectral range one therefore obtains the amplitude maximum at higher frequencies. At 6 GHz the amplitude difference is 10.65 percent or 0.49 dB and the phase difference is 15.4°. For the evaluation of the signals one can now use the phase or amplitude difference. Since the phase difference is harder to evaluate and is sensitive to line length fluctuations, in this case the amplitude difference is evaluated. The 6 GHz portion is used because for this one can use smaller probes and components than in the evaluation of the 3 GHz portion, and interference by the basic beam frequency can be eliminated by appropriate bandpass filtering. The beam position measurement should take place during operation within drift tubes in a standing-wave resonator with relocated coupling cavities, as shown in Section 2, FIG. 3. The drift tubes are located between resonators and are particularly well suited to beam position measurement because only the E-field of the electron beam is present here, while the RF signal takes the detour through coupling cavities. It is now of interest how the measuring location affects the received signals. The measuring probes which have a radius in the centimeter range are introduced radially from the outside into the drift tube. A comparison of the time signals is now made (FIG. 9). It can clearly be seen here that a "post-pulse oscillation" not to be disregarded takes place within the tube by means of reflections. For the evaluation of the 6 GHz component this is, however, a great advantage because the 6 GHz portion within the wave-shaped signal progression is thus far more strongly represented here and so the level differences within this component are more pronounced. In order to be able to design the subsequent receiving circuit including the digital evaluation according to the required accuracies it is necessary to determine the signal differences of the 6 GHz component with corresponding beam deviations from the ideal path of the electron beam. This takes place in turn with the aid of the CST Particle Studio program. FIGS. 10A and 10B show the result of the simulation. Particularly pronounced are the level differences, as expected, with large distances. But even with small deviations one obtains useable results. A beam deviation of 1 μm thus gives a level difference of 0.005 dB. In anticipation of the further description of the invention the output data of the external detector used in the preferred mixing concept and of the ADC (Analog-to-Digital Converter) of the measured data detection card are used to calculate the measuring accuracy. With a dynamic of 95 dB the used detector has a DC output voltage range of 2.28 V. One can therefore disperse precisely 0.035 mV with the existing 16 bit analog-to-digital converter. This corresponds to precisely 0.001 dB. With the existing receiving concept this means that one can theoretically detect a beam deviation from the ideal path of the electron beam of <1 μm.

Specification of a Beam Position Monitor

Detection Range

Figure 11:
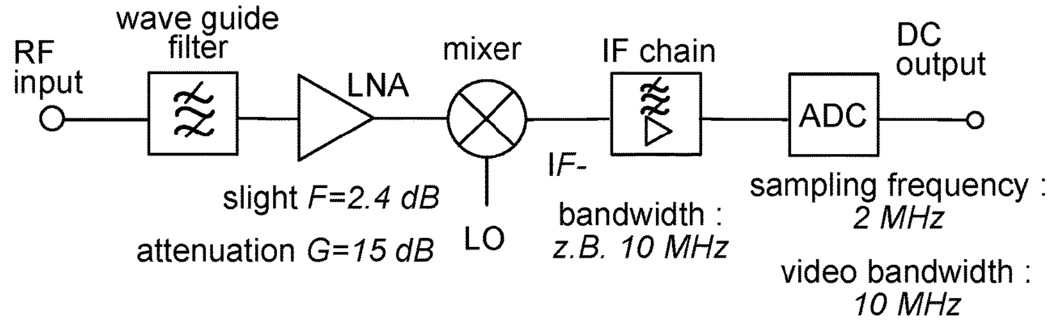
FIG. 11 shows a receiving concept for RSSI measurement consisting of a waveguide filter with slight attenuation in the passband, a low noise amplifier (LNA) with a specified noise figure, F, and amplification, an IF chain with a specified bandwidth and an analog-to-digital converter with a specified sampling frequency and video bandwidth.

However, the question of which minimum output can be measured with an RSSI receiver (RSSI=Receiver Signal Strength Indicator) is interesting. Ultimately, the minimally detectable output also determines the measuring accuracy of the beam position monitor. FIG. 11 shows the schematic diagram of a simplified receiver for measuring the received level, as investigated in detail over the course of the study and which was favored over other concepts in a number of embodiments due to its superior system properties. Crucial for the minimally detectable received output is the signal to noise ratio. The following follows from Erst, Stephen J. Receiving Systems Design; Dedham, Mass., ARTECH House; 1984, for the noise output of a receiver:

$$N=kTBF \tag{1}$$

with the Boltzmann constant $k=1.38\cdot 10^{-23}$ J/K, T=290 K, B the bandwidth and F the noise figure of the receiver. According to the noise figure, F, is calculated by:

$$F = F1 + \frac{F2-1}{G1} + \dots \tag{2}$$

According to FIG. 4.1 F1 and G1 stand for the LNA and F2 for the mixer. To be able to insert values into the equation, in anticipation of the later circuit design the current parameters of the components are used: LNA: F1=2.4 dB, G1=15 dB; mixer: 7 dB conversion loss. If one inserts these values into equation 2, the overall noise figure is F=2.706 dB. One can see that the mixer only contributes 0.306 dB to the overall noise figure. Therefore, subsequent IF amplifier steps contribute a negligible portion to the noise figure and so are of a purely academic nature. The minimum bandwidth of the receiver depends on the pulse length, in our case therefore 200 kHz. On the other hand, due to the "oversampling" signal processing concept proposed over the course of the study, an almost perfect reconstruction of the pulse is required. This relates in particular to the pulse flanks. These are in turn determined by the video bandwidth of the analog-to-digital converter (ADC). The ADC proposed in this study has a video bandwidth of 10 MHz, i.e. a flank rising time of 0.1 μs. In relation to the pulse length of 5 μs this is an acceptable value for the pulse reconstruction. The following follows according to Merrill Ivan Skolnik *Introduction to Radar Systems*; McGraw-Hill College; 1981:

$$\frac{N}{\text{dBm}} = -174 + 10\log(10^7) + 2{,}706 = -101{,}294 \tag{3}$$

The cable and system losses are taken into account with 1.294 dB, and so it follows: N=−100 dBm In order to be able to detect a sinusoidal signal with a probability of 99.99% and a false alarm rate of $10^{-7}$, according to Skolnik one requires a signal to noise ratio (SNR) of 17 dB and so the minimum detectable received level is: SNR=S/N and so S=−83 dBm. With a video bandwidth of 1 MHz the noise level would be reduced to −93 dBm. However, one would then have pulse rise flanks of 1 μs. The maximum detectable received output in the favored mixer concept is 0 dBm at the mixer input, i.e. −15 dBm at the receiver input. The following specification is therefore given for the whole system:

Frequency range: 5.996 GHz

Measuring accuracy beam deviation: <<100 μm

Dynamic range: ≥68 dB

Interface: detector output DC voltage

Structural technology: Radiation hard design of the RF circuit in the Kovar housing, no RF cable to the control centre.

Wave form: pulse length 5 μs; pulse repetition frequency: 50 to 200 Hz

Receiving Concepts

The preferred circuit concepts are all based on designing all receiving channels in parallel, ensuring by the choice of technology that there are no crosstalks between the channels, and dispensing with adjustable components such as AGC (Automatic Gain Control) amplifiers. The large dynamic range of approx. 70 dB should be realized by broadband, logarithmic detectors. All non-linearities of the circuits are detected by an automatic test station and stored in the digital signal processing electronics to be taken into account later when calculating the deviation of the electron beam from its ideal path. It should thus be ensured that a high degree of measuring accuracy is achieved. A further strength of the concepts is the digital signal processing concept which is designed such that a complete digital reconstruction of the 5 μs pulse is possible. No information should get lost in the RF and IF circuit. The digital circuit consists of a microcontroller with a corresponding periphery. After oversampling the detector output voltage to form the pulse reconstruction the data are sorted according to pulse and gap and only the data in the pulse are stored. Next the signal evaluation takes place with algorithms such as threshold detection, pulse integration, plausibility calculations, α/β trackers, etc. The then calculated deviation in x and y from the ideal path is made available to the control electronics via a digital bus, e.g. CAN or profibus. Subsequently, different receiving concepts are compared to one another for the purpose of evaluation. The first RF component of the receiving circuit is always the bandpass filter in all of the circuit concepts. This is preferably designed using waveguide technology in order to select the 6 GHz signal. The following planar receiving circuit is realized on a 0.635 mm thick aluminum oxide ceramic with bare die chips as active components. The RF circuit is mounted in a radiation hard Kovar housing which can be hermetically sealed. The signal evaluation takes place by means of control and evaluation electronics on an FR4 circuit board. The three concepts, which are also produced in hardware and measured, are described in sections 5.1 and 5.2.

Logarithmic Level Detection after Mixing

As already indicated above, the received signal on the coupling probes is initially filtered with a bandpass using waveguide technology in order to obtain a continuous 6 GHz signal from the broadband, pulsed probe signal during the 5 μs beam duration. This is followed by low-noise amplification with a LNA (Low Noise Amplifier). The advantage of the LNA is that even the smallest signal portions can be detected, and above all that the noise figure for the whole system can in this way be kept low. Attenuation outside of the useful band and further amplification follow. Next the 6 GHz signal is mixed into the IF range of approximately 500 MHz. This frequency range is chosen to be sufficiently low so that block condensers, which the GB (GB=Gain Block) requires in the IF range (IF=intermediate frequency range) can be used. The advantages of the lower frequency are the lower output losses and the possibility of achieving a very high frequency selectivity by filtering in the IF range. The IF signal can thus be guided out of the housing and be detected in an external, housed, logarithmic detector on a circuit board. In the mixing process the LO signal is generated by a VCO which is controlled by a PLL (Phase-Locked Loop). The latter is initialized by the microcontroller and controlled with the quartz-accurate desired frequency. The actual frequency of the VCO is guided to the PLL circuit by decoupling the VCO signal and by dividing the VCO signal by factor 4 by a frequency divider. In the PLL component this signal is divided internally once again and its phase is compared with the highly stable quartz signal. The VCO is thus corrected to 6.5 GHz by a control voltage ($V_{tune}$) which is filtered with a low pass. The design of the low pass constitutes a compromise between a short settling time (=large bandwidth) and low phase noise (=narrow band). The mixed-down signal is in turn amplified with a GB in order to equalize the conversion loss. Next bandpass filtering takes place in order to eliminate the portions of the RF and LO signal, which are greatly weakened by isolation measures but still present. The IF output conversion into a direct current (DC) by means of the logarithmic detector follows. The further strategy consists of oversampling the direct current, which runs for 5 μs, with approximately 2 MHz. One thus obtains 10 values in a pulse which are digitalized e.g. with the aid of a data acquisition card and which are stored in the memory of the PC (Personal Computer) via a USB bus. The databank generated in this way then serves to develop the algorithms and to design the operational signal processing electronics. The circuit should be designed for a power range of at least −20 to −55 dBm. The level range is limited to higher power by the saturation of the mixer and to lower power by the system noise. The active RF components are supplied with 6V.

In addition to the already mentioned advantage of the frequency selectivity in the IF range and the possibility of being able to use housed external detectors with which, in contrast to unhoused detector chips, there is a wide range of choice, in the IF range there are detectors with a high dynamic range of up to 95 dB and a high level of sensitivity. A further essential advantage of the concept is that higher harmonics can also be evaluated such as e.g. at 9 or 12 GHz, and so a further reduction of the receiving sensors, the waveguide filter and the high frequency guiding line structures can take place.

Logarithmic Direct Detection of the RF Received Signal and Diode Detector

Further receiving methods are logarithmic direct detection and the diode detector. In logarithmic direct detection, after initial bandpass filtering and amplification the signal is given directly at 6 GHz on the logarithmic detector. Next, exactly as with the mixing principle, oversampling, data storage and digital signal evaluation take place. Another possibility is the use of diode detectors. With this concept one would have the least hardware complexity. However, the method fails due to the insensitivity and the reduced dynamic of approx. 20 dB.

Sum and Difference Signal in the RF Range

An alternative concept is the sum and difference evaluation in the RF range. Here the signals are filtered using the tried and tested method and then, with the aid of a pi hybrid, the difference and the sum signal of two opposite channels are formed. Next they are then amplified and mixed down by means of an I/Q mixer (I=In-phase, Q=Quadrature) to direct current (DC). An I/Q mixer consists of two mixers which mix down the same signal, but with an LO signal shifted by 90°. This phase shift and the division of the LO signal into two channels is achieved either by means of a Pi/2 hybrid or by means of a 3 dB output divider which has a λ/4 delay line on one channel. One thus obtains a DC portion in phase (I) and a quadrature portion (Q) with 90° phase offset. By evaluating the difference signal one obtains the phase information (ø) of the signal with which one can infer the beam position according to the formula:

$$\phi = \arctan\frac{Q_\Delta}{I_\Delta} \tag{4}$$

The position offset (P) is calculated, standardized to the beam strength, using the formula:

$$P = \frac{\sqrt{I_\Delta^2 + Q_\Delta^2}}{\sqrt{I_\Sigma^2 + Q_\Sigma^2}} \tag{5}$$

The digital evaluation corresponds to the concepts dealt with above. The disadvantage of this concept is the strong frequency dependency between RF and the local oscillator (LO) which immediately leads to an undesired phase portion during mixing and so falsifies the result. Conversely this means that the LO and the RF input signal must have exactly the same frequency and so the requirements regarding the mechanical tolerances in the production of resonators are extremely high. This is unsuitable for industrial production.

Commercially Available Solutions

One could also use commercially available electronics as a receiving circuit. This consists of the following components:

1. 3 GHz bandpass filter and LNA in its own RF housing
2. Evaluation electronics as a 19 inch push-in card for the switching cabinet
3. A few meters of RF cable and supply line between the RF part and the evaluation electronics The disadvantages of this solution are obvious:

Only a 3 GHz version is offered, and so the probes and filters are twice as large as with a 6 GHz solution An expensive RF cable is required between the RF part and the evaluation electronics No complete 5 μs pulse reconstruction, only maximum value sampling, and so intelligent signal reprocessing (adaptive threshold detection, bunch pulse integration, pulse tracking) is only possible to a very limited extent, i.e. this is a very inflexible solution No integrated calibration. If required, this must be implemented subsequently, i.e. in offline operation of the Linac, and gives rise to considerable costs.

Very expensive, i.e. depending on the features well above 10,000 euros for 4 axes per measuring point Overall, commercially available electronics offer a very expensive solution which does not have the desired flexibility in order to be able to implement modern signal processing concepts.

Technological Implementation

The technological implementation of the logarithmic direct and IF detection are described in the following section. The first component of the two RF circuits is respectively the bandpass filter. It is advantageous here to use waveguide technology because in the waveguide electromagnetic waves with frequencies below the specific limit frequency of the respective waveguide are not propagable. With the evaluation of the 6 GHz component, one can eliminate the basic beam frequency of 3 GHz by appropriately choosing the geometric waveguide dimensions and ensure that there is not any interference in the receiving electronics. If one strives for a reduction of the waveguide, one can then fill it with dielectricum that has an $\in r>1$ without the transmission properties changing significantly. Advantageous in comparison to a planar filter in strip line technology are, moreover, the lesser transmission losses.

The RF receiving circuit is produced on aluminum oxide ($Al_2O_3$) ceramic with an $\in r$ of 9.8. In this way the receiving structures become smaller by the factor $\sqrt{\in r}$. Moreover, the effect of the ceramic is to dissipate heat and so is ideally suited for active components which convert their output loss into heat. The hardness of the ceramic material offers good bondability of the components. The ceramic substrate is protected by a Kovar housing which has the same thermal expansion coefficient as the substrate. It is thus ensured that the ceramic is not damaged by the housing during expansion caused by heat. In addition, the housing protects the components which are mounted in an unhoused form as "bare die" on the substrate with silver conductive adhesive and the bond connections of the latter. The bond connections are made with 17 μm gold wire. A further essential advantage arises from the use of the housing as RF and DC ground. This large-scale ground minimizes interference. The circuit ground should thereby be connected galvanically to the housing at as many points as possible on the substrate. A requirement for the use on the linear accelerator is an irradiation hard design. This is achieved by the Kovar housing with hermetically sealed, welded feedthroughs and lids. This method is tried and tested in space applications. Coplanar symmetrical stripline is used as technology. Both the conductor and the ground surfaces are located here on one side of the substrate. The essential advantage in comparison to microstrip line (MSL) is the fewer couplings of the lines. In all of the receiving concepts considered in this study two independent receiving channels per axis are required which of course respectively may not cause any crosstalk to the other receiving channel. An additional advantage in comparison to MSL is the simplified production for ground contacts for concentrated components due to simple bond connections.

Filters in Waveguide Technology at 6 GHz

Within the framework of the invention a waveguide filter has been designed which decouples the harmonic at 6 GHz. The filter has a bandwidth of approx. 145 MHz, as few losses as possible in the passband and a high degree of stopband attenuation. The specification of the bandwidth in the passband constitutes a compromise between a narrow band and a rapid settling time. The settling time should not become too long so that the filter quickly finds a stable state by means of the high-energy pulses of the electron beam to enable precise evaluation. The waveguide filter implementation follows now. Here, due to the good production possibilities, a filter with aperture-coupled cavity resonators is selected. In contrast to other filter arrangements the latter has resonators with consistent waveguide dimensions. The apertures are designed to be inductive so that one can produce two half shells by milling which can then be screwed together. The next development step consists of designing the cross-over between the waveguide and the coaxial cable. This is necessary because the probes have an SMA outlet and the receiving circuit has an SMA inlet. This cross-over can be designed to be inductive or capacitive. Due to the simpler production a capacitive cross-over was preferred here. For this purpose the inner conductor of the SMA connector was simply lengthened so that it projects into the waveguide. The distance from the waveguide wall in the longitudinal direction should be approximately 214 so that the existing short circuit on the waveguide wall produces an open circuit at the location of the coupling. In order to produce the filter one must break down the filter into two half shells so that the irises can be milled. It is most advantageous to produce two half shells because here the field-sensitive irises are not located in the connection plane of the shells. Moreover, by means of this construction technology no wall currents are crossed, and this has a positive effect upon the avoidance of losses. The screwed together waveguide filter was measured. It has one passband at 6 GHz with a return loss of better than −20 dB, but also further passbands such as e.g. at 8.3 GHz. One can eliminate these by connecting a coaxial low pass filter downstream. In an arrangement suitable for series production the low pass can be integrated into the capacitive coupling probe. In this case, however, this step for the purpose of a functional demonstration was dispensed with within this framework. In order to be able to position the receivers better on the LINAC for the beam position measurement the filter was reduced by introducing a dielectric. Polyphenylene sulfide (DIN abbreviation: PPSGF 40) was chosen in this case. This approximately halves the physical length because at 6 GHz $\epsilon r=4.2$. The decision to use this material is based upon the almost equal linear thermal length expansion coefficient to aluminum (filter housing was produced from aluminum), the low moisture absorption and the low dielectric loss factor.

Design and Structure of the Receiver Circuits

Receiver with Mixer and Logarithmic Detection

In the following the implementation of the receiving concept introduced in Section 5 of the logarithmic detection after mixing is described in detail. The first development step consists of determining the geometric dimensions of the circuit upon the basis of practically implementable physical values using thin film and housing technology. Next the structures are implemented in a layout with the aid of the ADS (Advanced Design System) simulation program. In order to produce the aluminum dioxide substrate with a thickness of 0.635 mm a chrome mask is produced and the circuit is then processed in the thin film laboratory. After producing the substrate the chip components are mounted with silver conductive adhesive, the assembled substrate is fitted in the Kovar housing, the connections of the chips are bonded to the substrate with gold wire, and SMA connectors and connection pins are welded by laser into the Kovar housing. All of these structures were drawn with the Auto-CAD drawing program. They were designed such that a 50 Ohm system is the basis of all of the frequent signals. The implementation of the coplanar line dimensions additionally includes a compromise here between a small space requirement and low-tolerance manufacturability. This is taken into account in the layout by a line width of 100 μm and a slot width of 50 μm. In contrast, the lines carrying DC can by all means be designed to be narrower or wider.

The Mixer Core

Figure 13:
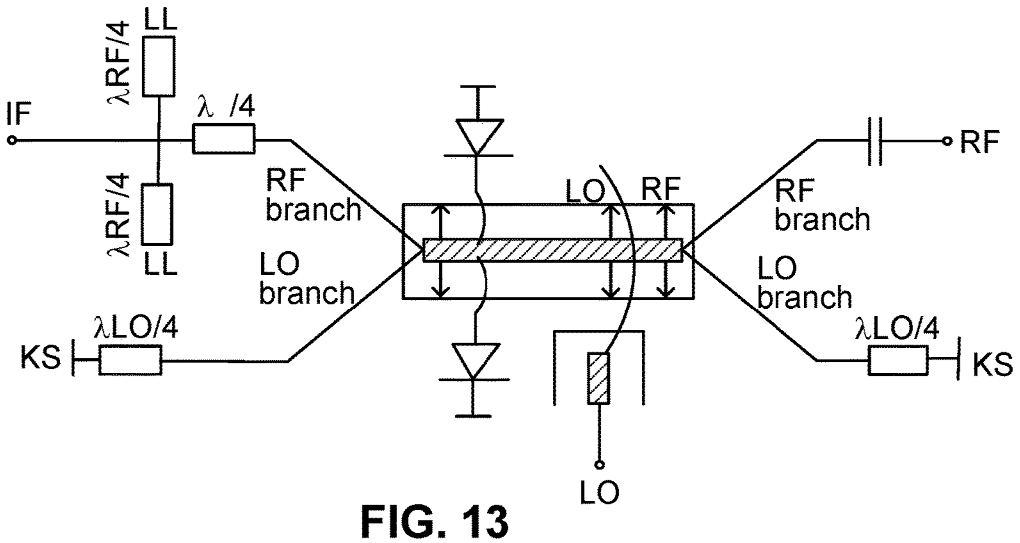
FIG. 13 shows the schematic diagram of the mixer. The latter includes a RF, an IF and an LO branch. Two diodes are arranged in a push-pull manner in the central line structure and the LO signal is guided here as a slot wave, the RF and the IF signal being guided as a coplanar wave.

In the receiving concept with a mixer the central components are the two mixer structures. An IF signal is produced by using the non-linear characteristic curve of the diodes by means of the high-frequency LO signal and the adjacent RF signal. The frequency of the IF signal is relative to the frequency offset between the RF and LO signals. The IF signal is produced simply balanced by two push-pull diodes. In order to better illustrate the structure there is once again a schematic diagram that, for better understanding, includes line components, discrete components and the E field directions of the different waves—FIG. 13. A distinction is made between an LO and a RF branch which are integrated into a structure in the layout. Proceeding from the LO line, which carries a coplanar wave, a slot wave is produced by a bond wire to ground. By the coplanar wave the E field vectors in the slots point in the opposite direction and by the slot wave in the same direction. At a distance of $\lambda_{LO}/4$ the slot wave is respectively short-circuited in the direction of the IF gate by a line interruption and in the direction of the RF gate by a ground bond across the line. One thus obtains a standing wave which has open-circuited condition at the diodes. The diodes are thus used and the LO signal outside of this line is eliminated and so isolated. In order to isolate the RF connection the RF signal is carried to the diodes via an interdigital capacitor with the length $\lambda_{RF}/4$. In contrast, in the direction of the IF gate the isolation takes place by means of open-circuited stubs. The stubs transform open-circuit into short-circuit at the point where the stubs strike the IF line. The RF wave is therefore reflected at this point, forms a standing wave and generates the open-circuit condition at the diodes by means of the $\lambda/4$ transmission line. The LO, RF and IF gate are thus isolated from one another by the line structures used. The choice of diodes is of crucial significance in the mixing process. Silicon Schottky diodes were chosen. Due to their high limit frequency they have a low conversion loss. The diodes are arranged such that there is one diode on the line which is bonded to ground, whereas the other is positioned on the ground and is bonded to the line. This corresponds to an arrangement for a push-pull mixture. The cathode is always located on the ground here. Rotation of the chosen diode is not possible by means of the anode designed "like a snout". Therefore the flow direction in the diodes is always from the top to the bottom. In the mixing process the field in the slot is then coupled into the diodes by the bond wire.

Figure 12:
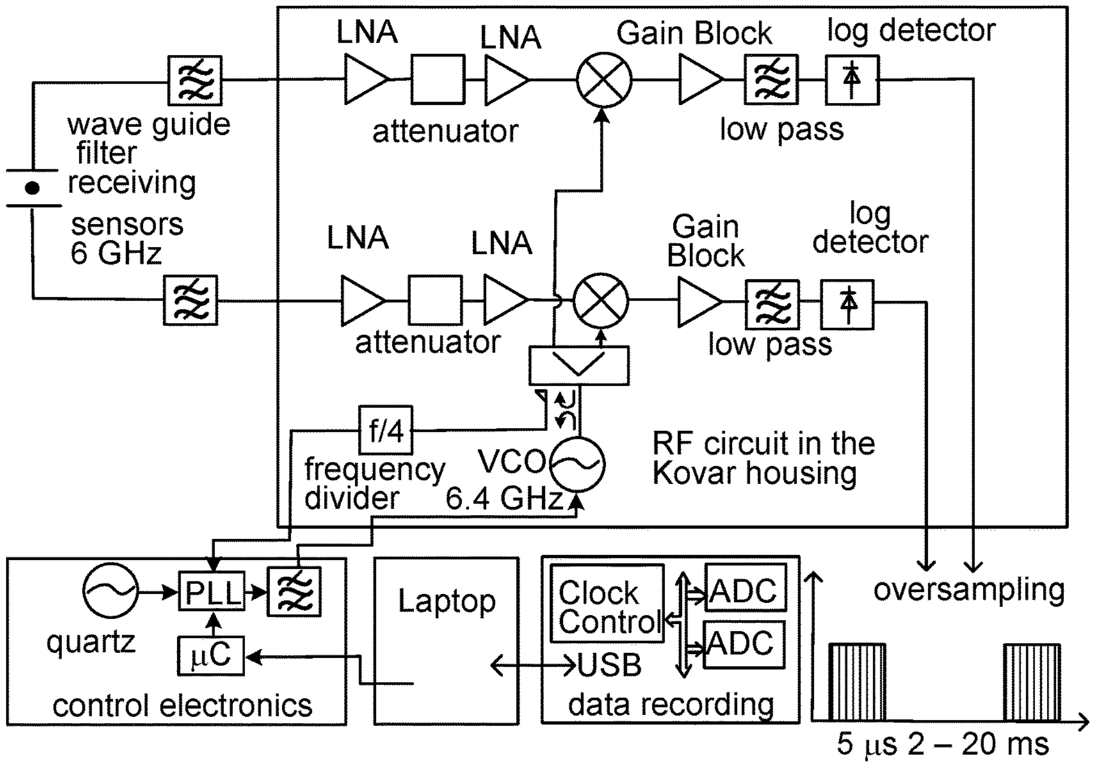
FIG. 12 shows the block diagram of the logarithmic detection after mixing, consisting of the receiving probes, waveguide filtering, a RF circuit in a Kovar housing, data acquisition which uses the principle of oversampling, a laptop and control electronics. The aforementioned components have the specified circuit structure as described.

In this section a challenging yet very well functioning mixer structure has been explained. The advantages of this structure in comparison to a normal ring mixer, as offered by many component manufacturers, are as follows:

- Clearly less space requirement
- Compatibility with coplanar technology, no expensive vias in the production of the ceramic
- Avoidance of extremely narrow band attributes Evaluation and Results The assessment of the results of the mixing concept is subsequently carried out with a chip detector and an LNA (FIG. 12). For this purpose a RF receiving channel is fed with a different power at 6 GHz and the DC voltages detected at the detector output are measured with a multimeter. It is established that power below approximately −33 dBm are no longer recorded on the detector. After extensive investigation and spectral analysis without a detector it was established that the VCO signal that has an output power of 13 dBm, is recorded with −33 dBm on the detector, and so prevents the evaluation of lower RF power. Therefore, the concept of mixing with an integrated chip detector is eliminated as a candidate for the series solution. The "penetration" of the VCO signal should actually avoid the filter. However, it was also established that not all signal portions take the designed path to the detector. One could resolve this problem of crosstalk by positioning the VCO and the detector away from one another or by not positioning both components in one housing, as in the case of the mixing principle with an external detector.

Receiver with a Mixer and an External Logarithmic Detector

Figure 14:
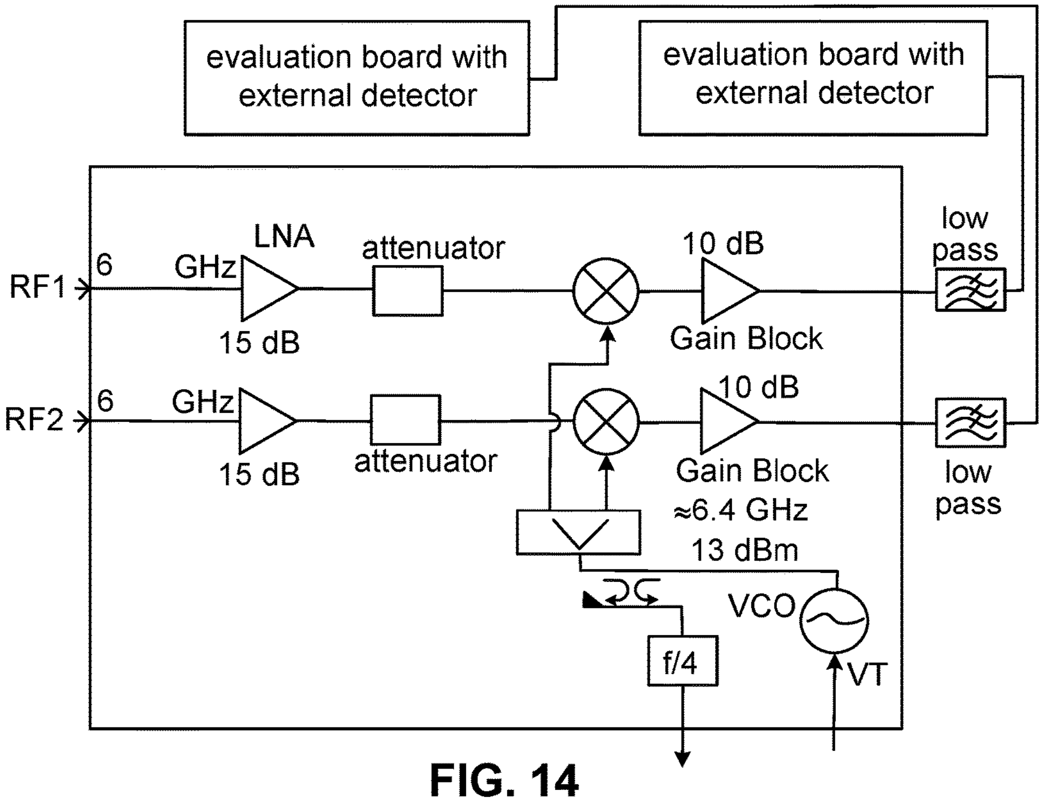
FIG. 14 shows the block diagram of the receiver with an external detector. In this case the logarithmic detector is located outside of the RF housing. The detector is tested on an evaluation board because of the initial development status.

As described in the previous section, there is the problem that in the mixing concept with a chip detector all frequencies from 0 to 10 GHz are detected, and so the VCO is also detected, and so the detection result is falsified. A good possibility for achieving frequency selectivity is the use of an external, housed detector which is mounted on an FR4 circuit board. Here, in contrast to the detector chips, of which currently only the HMC611 made by Hittite is commercially available, there is a wide selection of detectors for different dynamic and frequency ranges. The AD8310 made by Analog Devices was selected. This detector is characterized by its large dynamic range of 95 dB and a frequency range of DC to 440 MHz. It is therefore possible to mix down to an intermediate frequency of 400 MHz and to block the lower frequencies by means of a highpass filter. It is thus possible to evaluate the useful signal in a narrow band. The external detector was measured in the arrangement according to FIG. 14.

Figure 15:
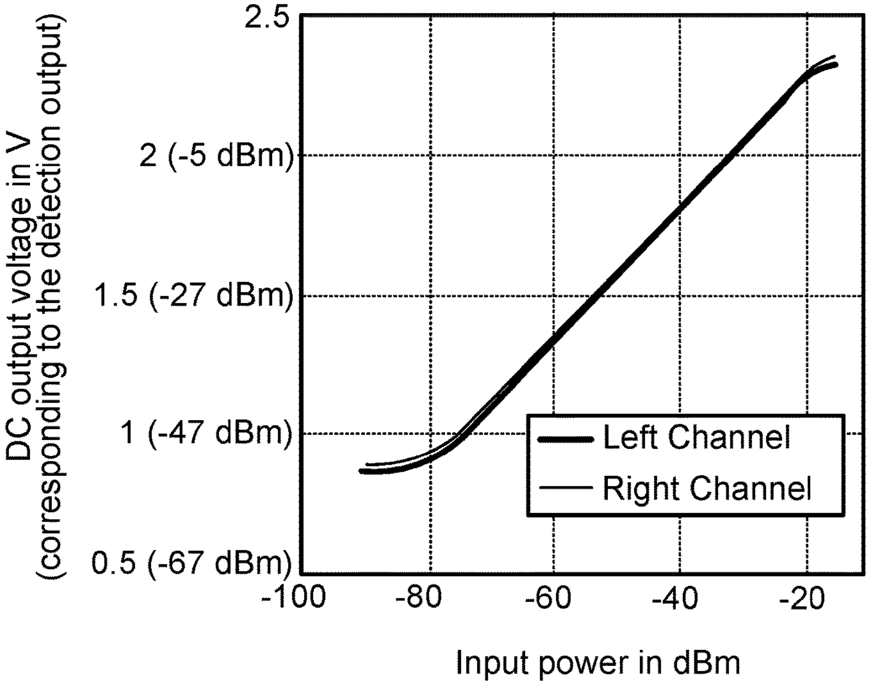
FIG. 15 shows the measurement results of the receiver with an external detector. Two almost identical curves are produced which have fairly linear characteristics at input power of −80 to −20 dBm.

In the present state of development the manufacturer's Evaluation Boards were used. In addition to the logarithmic amplifier they also include extensive wiring, which can be adapted to the respective application by means of jumpers. As the next development step one would develop a FR4 board which includes the logarithmic amplifiers as well as the analog-to-digital converters and the digital signal processing electronics. FIG. 15 shows the measuring curve of the two channels.

Calibration of the Whole System

Figure 16:
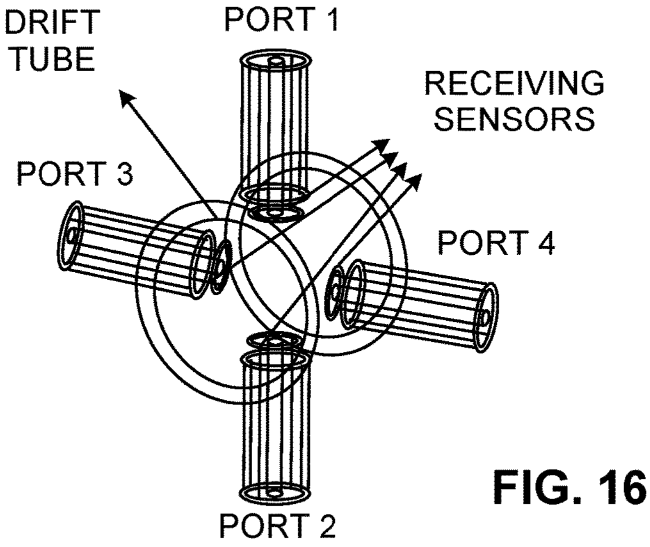
FIG. 16 shows the arrangement of the receiving probes within a drift tube. With this arrangement the electron beam can be received and also opposite receiving channels can be calibrated according to the described principle.
Figure 17:
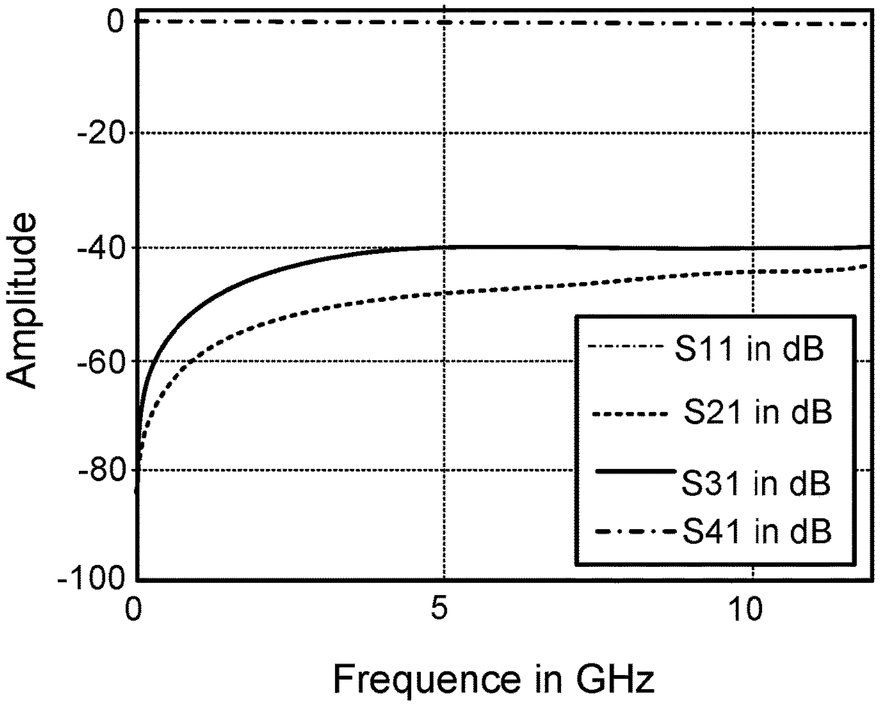
FIG. 17 shows the transmission function of probe calibration. Here a signal is fed in at port 1, and received at port 3 and port 4 in order to calibrate them. There is an isolation of approx. 40 dB between the transmitting port and the receiving port.
Figure 18:
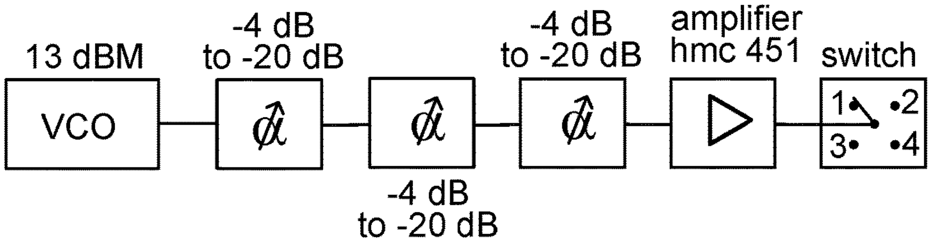
FIG. 18 shows an advantageous circuit arrangement to feed the calibrating concept, consisting of a VCO, components of an attenuator, an amplifier and a switch.

A further crucial advantage of this structure is the inclusion of the probes in the calibrating process. One could therefore measure all non-linearities, including the probes, up to the analog-to-digital converter before the start of the operational running. These channel differences could be stored in the digital evaluation circuit and could be corrected during operation. For this reason a signal at 6 GHz is fed in one of the receiving probes, and this signal is received exactly equally at the respectively directly adjacent probes taking into account the correction. FIG. 16 shows the situation in the calibration process. FIG. 17 shows the simulation results. As can be seen from the graph, the high isolation of −40 dB is problematic because it must be overcome by over-coupling onto the receiving probes. The attenuation arises due to the mismatch. For this reason a transmitting signal from 20 dBm to at least −20 dBm must be generated to be able to cover the whole dynamic range of the receivers from approximately −20 to −60 dBm. The structure shown in FIG. 18 is advantageous. The VCO from the operational receiving circuit is used with an output power of 13 dBm. Unlike the operational hardware, the VCO frequency is locked at 6 GHz. Three attenuators follow which in practice have attenuation of −4 to −20 dBm. After the attenuators one can amplify the signal well. The HMC 451 amplifier made by Hittite is suitable for the application. An SPDT switch (Single Pole Double Throw switch) then follows which allows the calibration of all four channels.

According to the invention a distance measurement apparatus with an evaluation electronic for determining the position of an electron beam is characterized by the facts that the evaluation unit has at least two coupling probes for decoupling an electromagnetic wave of the electron beam and that the decoupling of the electromagnetic wave takes place in at least one drift tube of an electron linear accelerator, and that the evaluation unit is designed to evaluate a frequency range of the decoupled electromagnetic wave which has a center frequency that corresponds to a multiple of the frequency of the electromagnetic wave which is fed into the linear accelerator by the high frequency generator in order to generate the acceleration field. The packaging of the electrons within the linear accelerator tube has an advantageous effect upon the evaluation of the frequency range described.

Advantageously, with the use of two coupling probes the latter are arranged with an offset of 180 degrees on the cylinder rim of the drift tube, and with the use of 4 coupling probes the latter are arranged with an offset of respectively 90 degrees in order to be able to determine the deviation of the electron beam in the vertical and horizontal direction.

According to an advantageous configuration the coupling probes in a 50Ω system are matched in the frequency range of the wave to be decoupled, they have a low coupling factor in order to draw as little energy as possible away from the electron beam, and the coupling takes place capacitively or inductively or by means of slot coupling or a combination of these.

According to an advantageous configuration the field to be decoupled is preferably an electromagnetic wave in the TEM mode with a frequency in the range of 5 to 20 GHz. Preferably, the frequency corresponds to the first harmonic of the basic beam frequency of the acceleration field.

According to an advantageous configuration there is a receiver connected in series to each of the coupling probes through a waveguide, which has as the first coupling-probe side component a narrow-band RF bandpass filter with a center frequency which corresponds to the decoupled electromagnetic wave.

According to an advantageous configuration the bandpass filter is designed as a waveguide filter with or without dielectric filling or as a dielectric filter or preferably as a planar filter in order to achieve the most compact design possible.

According to an advantageous configuration the respective receiver has a low-noise amplifier, then a mixer with a local oscillator, preferably a voltage-controlled oscillator, then a narrow-band IF filter, then a logarithmic detector, then an analog-to-digital converter, and then a digital signal processing unit.

Advantageously the bandwidth of the IF filter is preferably dimensioned to e.g. 10 MHz so that the reconstruction of the amplitudes of the pulse packets of the electron beam is possible e.g. with a duration of 5 μs. In an advantageous further development the video bandwidth of the analog-to-digital converter corresponds to at least the bandwidth of the IF filter.

Advantageously, in order to calibrate the receivers, by means of a transmitting/receiving switch between the RF bandpass filter and the low-noise amplifier, a signal is fed into the drift tube by the respective coupling probe which has the same frequency as the wave to be decoupled during operation.

Advantageously, e.g. in a design with 4 coupling probes, the calibrating signal can be fed in through the respective center coupling probe and be received by the two adjacent coupling probes arranged with an offset of +/−90 degrees.

According to an advantageous configuration a distance is determined, in particular using the distance measurement apparatus according to the invention, according to a method for determining a distance, the method comprising the steps:

- provision of a drift tube which has a decoupling region, with at least 4 coupling probes respectively arranged with an offset of 90 degrees each being connected by waveguides to a RF receiver, and
- in the calibration mode an electromagnetic wave is fed in through at least 1 coupling probe, and
- the field strength of the electromagnetic field of the electron beam is decoupled by the coupling probes.

Advantageously the calculation of the beam deviation takes place in an axis, e.g. vertically or horizontally, by forming a difference between the amplitude values of the received signals of two opposite coupling probes.

In an advantageous further development the calibration signal fed in through a coupling probe is received in the two adjacent coupling probes and the amplitude difference between the two receiving channels is established as a correction value, stored, and applied during operation when the electron beam is present in order to correct the beam deviation.

The invention claimed is:

1. A distance measurement apparatus comprising:

an evaluation unit for determining a position of an electron beam; and at least two coupling probes for decoupling a measurement signal based on an electromagnetic wave generated by the electron beam, wherein the decoupling of the measurement signal based on the electromagnetic wave takes place within an acceleration tube of an electron linear accelerator with cavity resonators, and within a drift tube which serves as a feed-through section of the electron beam between two cavity resonators and as the decoupling region, and in order to increase a strike accuracy of the electron beam on a photon target, the evaluation unit is configured to evaluate a frequency range of the decoupled electromagnetic wave that has a center frequency that corresponds to a multiple of the frequency of the electromagnetic wave that is fed into the linear accelerator by a high frequency generator in order to generate an acceleration field; and a receiver connected in series to each of the coupling probes through a waveguide, which has as a first coupling-probe side component a narrow-band RF bandpass filter with a center frequency that corresponds to the decoupled electromagnetic wave.

2. The distance measurement apparatus according to claim 1, wherein the two coupling probes are arranged with an offset of 180 degrees.

3. The distance measurement apparatus according to claim 1, comprising four coupling probes arranged with an offset of 90 degrees, respectively, on the cylinder rim of the drift tube.

4. The distance measurement apparatus according to claim 1, wherein the coupling probes are configured for a 50 n system and are matched to a frequency range of the wave to be decoupled, such that the coupling probes have a low coupling factor to reduce an amount of energy drawn from the electron beam, and the coupling is at least one of one of capacitively, inductively or by slot coupling.

5. The distance measurement apparatus according to claim 1, wherein the field to be decoupled is an electromagnetic wave in a TEM mode with a frequency in the range of 5 to 20 GHz.

6. The distance measurement apparatus according to claim 1, wherein the bandpass filter is configured as a waveguide filter (i) with or without dielectric filling or (ii) as a dielectric filter or a planar filter.

7. The distance measurement apparatus according to claim 1, wherein a respective receiver in a series connection includes a low-noise amplifier, coupled to a mixer with a local oscillator, being a voltage-controlled oscillator, coupled to a narrow-band IF filter, coupled to a logarithmic detector, coupled to an analog-to-digital converter, coupled to a digital signal processing unit.

8. The distance measurement apparatus according to claim 7, wherein a video bandwidth of the analog-to-digital converter corresponds at least to a bandwidth of the IF filter.

9. The distance measurement apparatus according to claim 1, further comprising a first two cavity resonators and the decoupling of the measuring signal is performed in a decoupling region between a second two cavity resonators in which the field strength of the acceleration field is lower than the field strength of the first two cavity resonators, and at least one coupling probe is located in the decoupling region.

10. The distance measurement apparatus according to claim 1, wherein a basic mode of the acceleration field is attenuated within the drift tube in the decoupling region.

11. A distance measurement apparatus comprising:

an evaluation unit for determining a position of an electron beam;

at least two coupling probes for decoupling a measurement signal based on an electromagnetic wave generated by the electron beam, wherein the decoupling of the measurement signal based on the electromagnetic wave takes place within an acceleration tube of an electron linear accelerator with cavity resonators, and within a drift tube which serves as a feed-through section of the electron beam between two cavity resonators and as the decoupling region, and in order to increase a strike accuracy of the electron beam on a photon target, the evaluation unit is configured to evaluate a frequency range of the decoupled electromagnetic wave that has a center frequency that corresponds to a multiple of the frequency of the electromagnetic wave that is fed into the linear accelerator by a high frequency generator in order to generate an acceleration field; and a transmitting/receiving switch located between the RF bandpass filter and a low noise amplifier, wherein to calibrate two opposing receivers the drift tube is configured to receive a signal by the respective coupling probe that has the same frequency as the wave to be decoupled during operation, and that is decoupled at two other probes and used to determine a correction factor for the electron beam measurement.

12. The distance measurement apparatus according to claim 11, further comprising four coupling probes wherein the calibration signal is fed in through a center coupling probe, respectively, and is received by two adjacent coupling probes arranged with an offset of +/−90 degrees.

* * * * *